(12) United States Patent
Harle et al.

(10) Patent No.: US 6,705,012 B1
(45) Date of Patent: Mar. 16, 2004

(54) METHOD FOR MAKING CATALYST CONTAINERS AND IMPLEMENTING DEVICE

(75) Inventors: Guillaume Harle, Haguenau (FR); Georges Ionescu, Haguenau (FR); Adrien Lehmann, Schleithal (FR); Daniel Frey, Altenstadt (FR); Georges Roegler, Rott (FR)

(73) Assignee: Wimetal S.A., Wissembourg (FR)

( * ) Notice: Subject to any disclaimer, the term of this patent is extended or adjusted under 35 U.S.C. 154(b) by 0 days.

(21) Appl. No.: 10/030,921

(22) PCT Filed: Jul. 13, 1999

(86) PCT No.: PCT/FR99/01717
§ 371 (c)(1),
(2), (4) Date: Jan. 14, 2002

(87) PCT Pub. No.: WO01/04469
PCT Pub. Date: Jan. 18, 2001

(51) Int. Cl.[7] ............................................. B21D 51/16
(52) U.S. Cl. ........................... 29/890; 29/430; 29/783; 29/787; 29/795
(58) Field of Search ......................... 29/890, 890.08, 29/430, 512, 407.05, 771, 783, 788, 791, 796, 822, 787, 795

(56) References Cited

U.S. PATENT DOCUMENTS

| | | | | |
|---|---|---|---|---|
| 3,646,657 A | * | 3/1972 | Small | 29/890.08 |
| 4,486,932 A | * | 12/1984 | Hall et al. | 29/890.08 |
| 4,738,013 A | * | 4/1988 | Yamashita et al. | 29/890 |
| 4,750,251 A | * | 6/1988 | Motley et al. | 29/890 |
| 4,782,570 A | * | 11/1988 | Spridco | 29/890 |
| 5,042,125 A | * | 8/1991 | Harwood et al. | 29/796 |
| 5,105,516 A | * | 4/1992 | Enomoto et al. | 29/890 |
| 6,389,693 B1 | * | 5/2002 | Aranda et al. | 29/890 |
| 2003/0000088 A1 | * | 1/2003 | Mayfield | 29/890 |
| 2003/0154600 A1 | * | 8/2003 | Umeda et al. | 29/890 |
| 2003/0159286 A1 | * | 8/2003 | Behner et al. | 29/890 |

FOREIGN PATENT DOCUMENTS

| | | |
|---|---|---|
| DE | 197 23 939 | 12/1998 |
| EP | 0 916 416 | 5/1999 |
| EP | 0 921 282 | 6/1999 |
| WO | WO 98/25714 | 6/1998 |

* cited by examiner

Primary Examiner—David P. Bryant
(74) Attorney, Agent, or Firm—Young & Thompson

(57) ABSTRACT

A method and a device for making catalyst containers preparing, on a single semi-automatic production line, a station (1), at least a monolith enclosing the monolith with an insulating mat and bonding the insulating mat on the monolith; then slipping and automatically positioning the assembly obtained, in a precut tube, into a mounting and positioning assembly (2); etching the tube in an etching station (3); then transferring it into specific elements (5) for retaining, clamping and driving it in rotation; inserting an insulating cone at stations (5) dispensing and installing insulation cones; heating simultaneously the ends of the precut tube at a heating installation (6) maintaining the temperature at the ends to be deformed; deforming the ends, after a predetermined temperature is reached using a device with deforming rollers (7), while maintaining the forming temperature; extracting and evacuating the resulting container after the floturning and spinning process, towards a continuous cooling device (8), the box being delivered, at the outlet of the cooling device (8) into collecting elements (9) before being stored, conditioned or subsequently assembled.

24 Claims, 5 Drawing Sheets

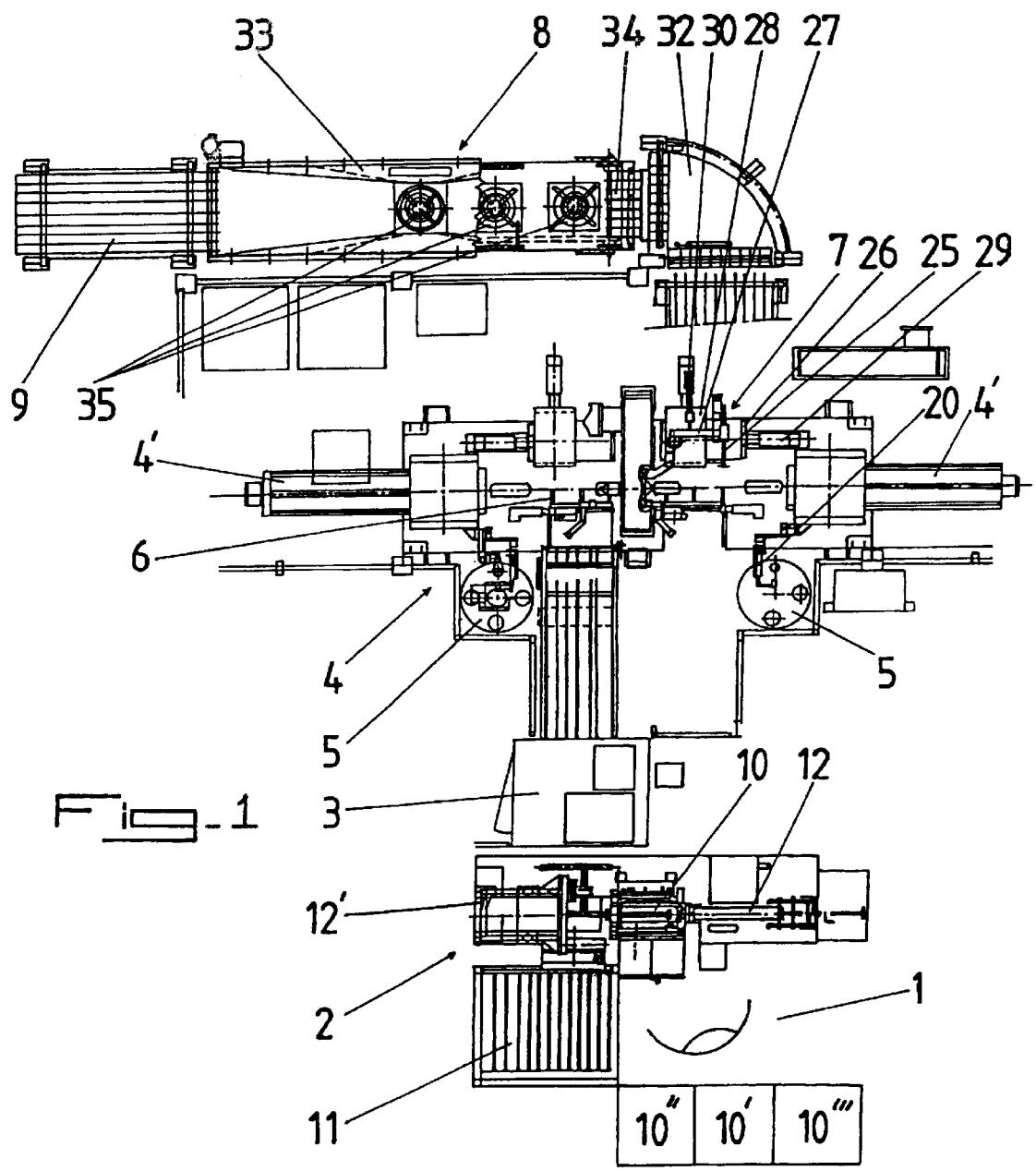
Fig_1

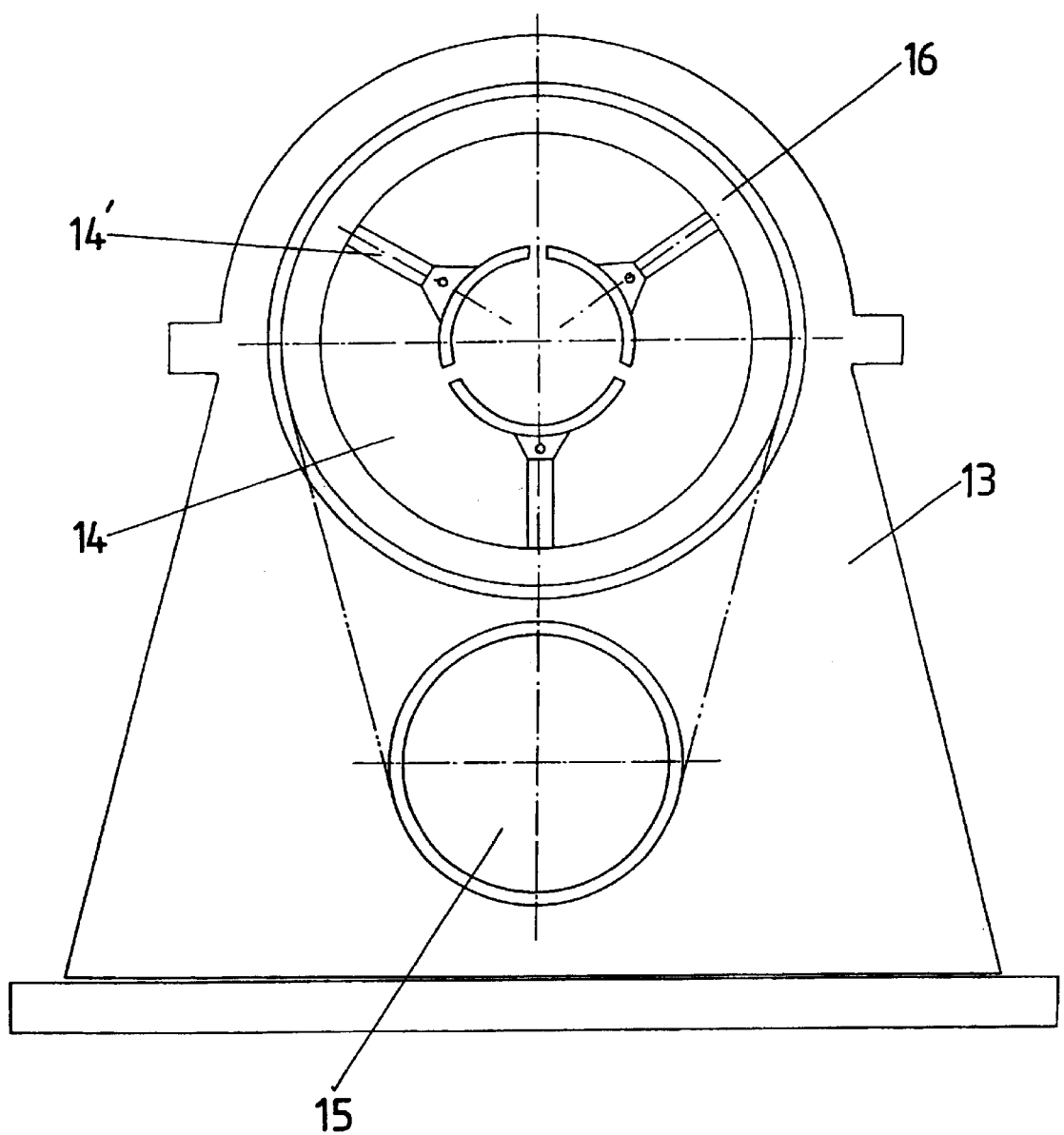

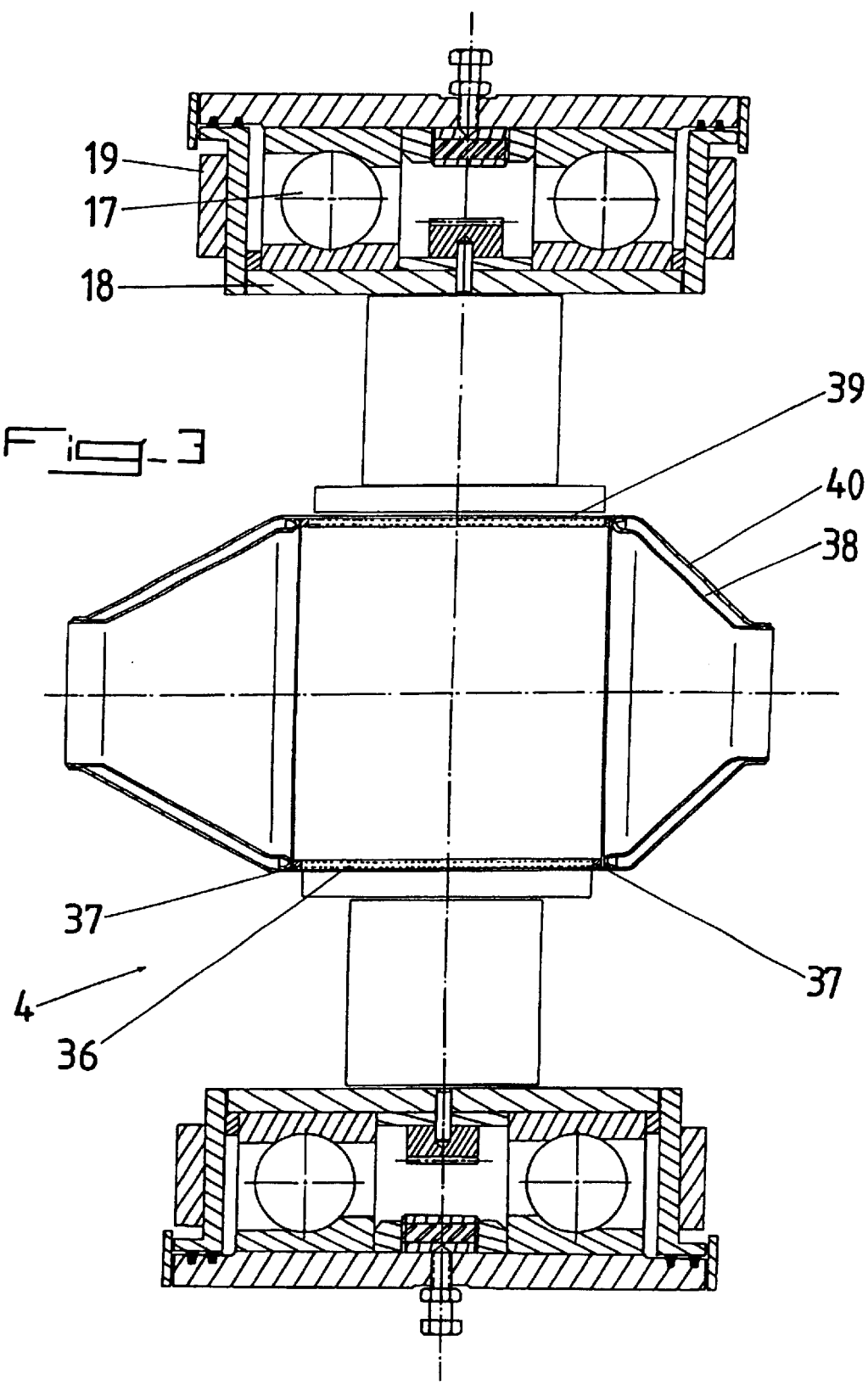

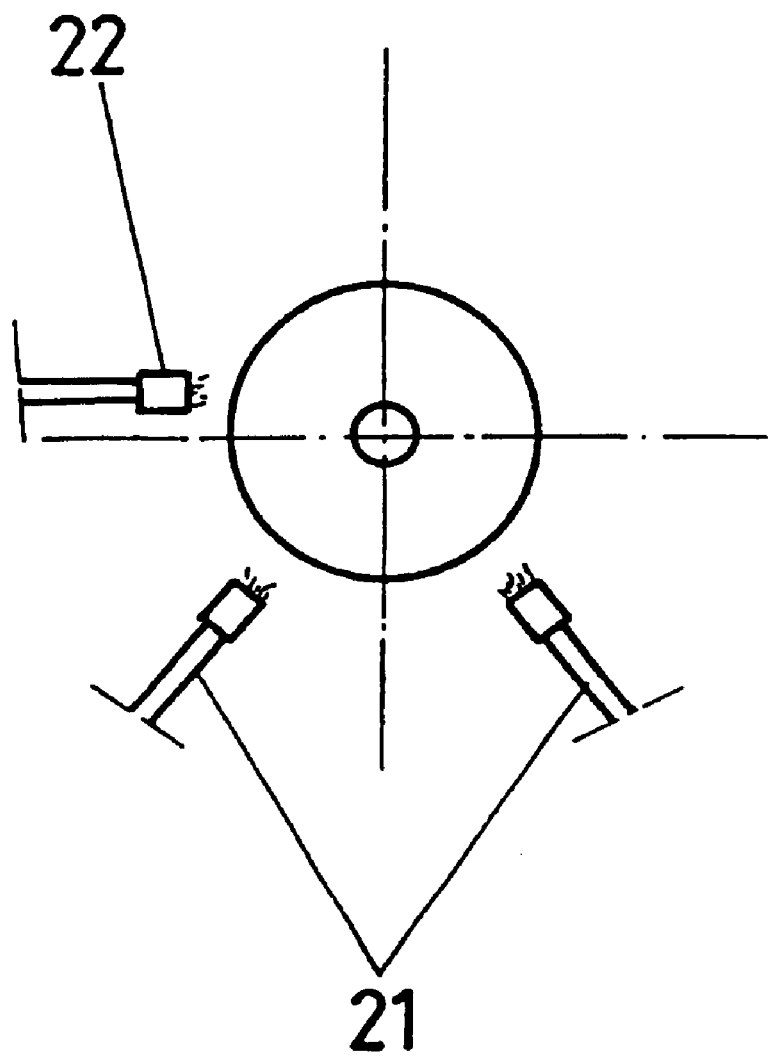

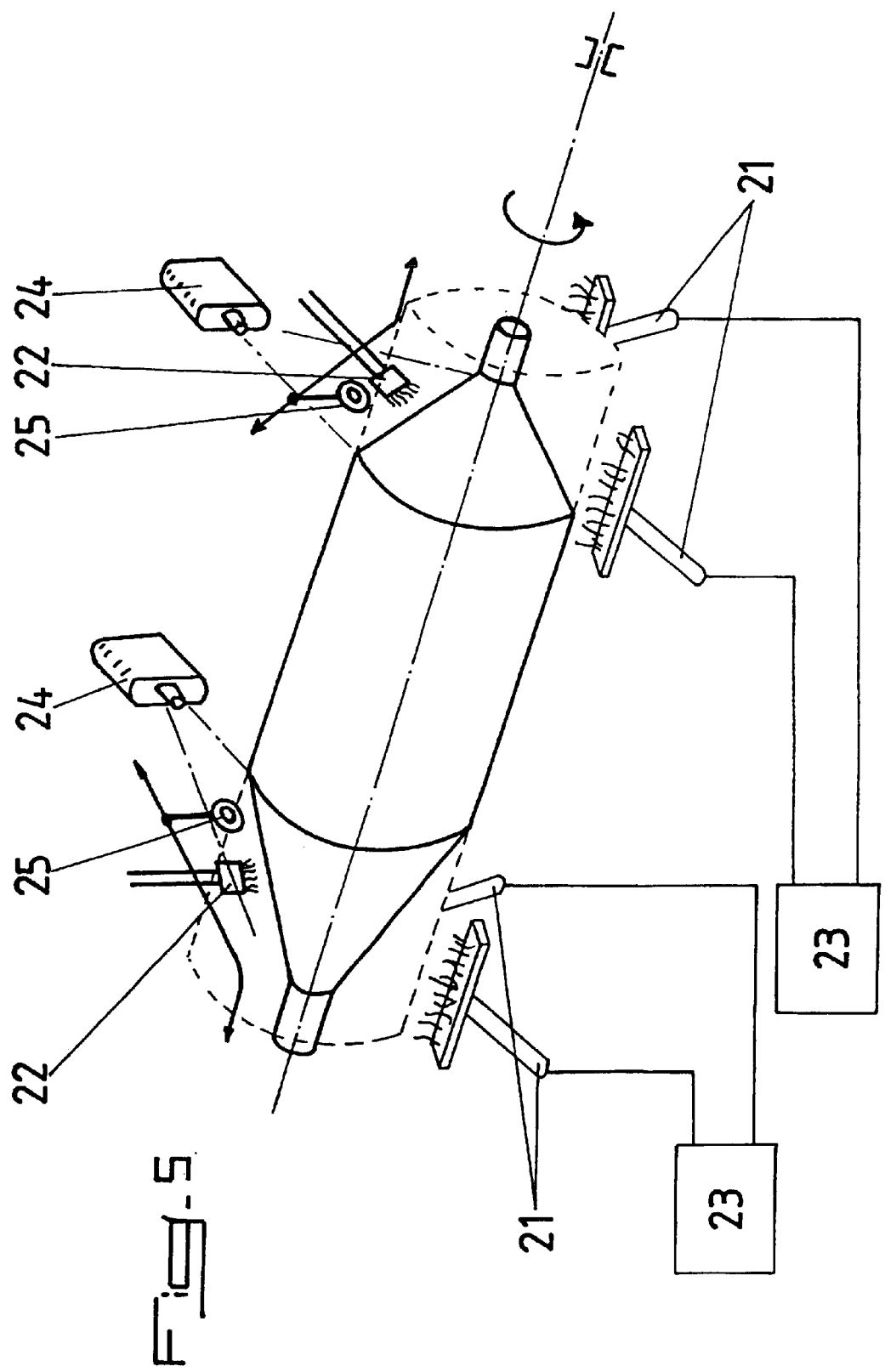

METHOD FOR MAKING CATALYST CONTAINERS AND IMPLEMENTING DEVICE

The present invention relates to the industrial field of automotive equipment, more particularly exhaust devices, particularly catalytic containers, acoustic catalytic containers and mufflers, and has for its object a process of producing catalytic containers.

The invention also has for its object a device for practicing this process.

Catalytic exhaust containers are generally in the form of a porous active monolithic body surrounded by an insulating mat and disposed in a cylindrical recess of corresponding size, this recess being provided at its ends, if desired with the interposition of corresponding porous holding rings, of truncated conical parts, if desired insulating, for connection to corresponding connection pipes.

Generally, the porous active monolithic body, which is constituted in the form of one or several cylindrical elements, is fixed by means of adhesive strips or metallic fasteners, in the insulating mat and is if desired provided at its ends with corresponding porous holding rings, then the obtained assembly is mounted in a pre-cut tube, by means of an independent insertion machine pushing said assembly into said tube. This new subassembly is provided with a marking reproducing the different characteristics of the catalytic container, then the ends of the pre-cut tube are if desired provided internally each with a truncated conical concentric wall, on which said ends are deformed in truncated cones by rotary spinning or by hot pressing, after preliminary heating of the latter by induction, to produce peripheral chambers that are insulating or not, forming the connection parts to corresponding pipes.

The porous holding rings, which can be mounted at the ends of the active monolithic body, are generally made of a metallic mesh. The truncated conical concentric walls which can be mounted within the pre-cut tube, on opposite sides of the active monolithic body, can if desired be provided with metallic mesh rings, and are first produced by rotary spinning or by stamping and are disposed in said pre-cut tube before the respective rotary spinning or pressing operations of the two ends.

The operations of deformation by rotary spinning or pressing of these ends are at present carried out successively and independently, either on a same machine, with turning and reassembly at the end of the first operation, or on two identical machines mounted opposite each other or side by side, the two being then dismounted from the first machine after the first operation, to be reassembled with the rotary spun end in the second machine, for carrying out the second operation.

The machine or machines used for this purpose are preferably of the horizontal spindle type with digital control. In the case of the use of two machines mounted in opposition, it suffices merely to provide a rectilinear transfer means for the piece to be machined, from the first toward the second machine. In the case of the use of two machines disposed side by side, the corresponding transfer devices of the type permitting turning of the workpiece during its transverse movement from one machine to the other.

The truncated conical concentric walls adapted to be mounted if desired within the pre-cut tube for the production, by rotary spinning or pressing of the ends of said pre-cut tube, of the peripheral insulating chambers forming the connection portions to the corresponding pipes, are preferably mounted in the corresponding ends during the intermediate operations, just before rotary spinning or pressing of the corresponding ends.

These processes for producing known catalytic containers permit of course the obtention of technically correct workpieces. However, their use is relatively long and complex, requiring separate work stations, in certain of which the operations are carried out entirely manually, such that the time necessary for the production of these containers is relatively long, which considerably increases their sales price.

Moreover, the operation time is also prolonged, because the heating of the ends of the pre-cut tube, before the operations of rotary spinning or pressing, must be carried out entirely independently of these operations, which is to say by first placing about said ends induction heating means, these means having to be removed to permit the use of deformation rollers.

The present invention has for its object to overcome these drawbacks by providing a process and device for the production of catalytic containers, permitting producing said containers in a series of uninterrupted operations limiting human intervention to a minimum of operations.

To this end, the process for production of catalytic containers is characterized in that it consists essentially, on a single semi-automatic line, in preparing at least one monolithic body, if desired with metal mesh end rings, in surrounding said monolithic body with an insulating mat and cementing said insulating mat to said monolithic body, then inserting and positioning the obtained subassembly, automatically, in a pre-cut tube, marking said tube with its technical characteristics, then transferring it into a specific means for holding, gripping and driving in rotation, introducing if desired into each end of the pre-cut tube an insulating cone, then simultaneously heating the ends of said pre-cut tube, deforming said ends, after reaching a predetermined temperature, by means of a roller deformation device, while holding a forming temperature, withdrawing and discharging the obtained container after the rotary spinning or pressing operation, toward a continuous cooling device, the container being received at the outlet of this cooling device in an accumulation means before ultimate storage, processing or assembling.

The invention also has for its object a device for practicing this process, characterized in that it is essentially constituted by a station for preparing at least one monolithic body, by a mounting and positioning assembly for said monolithic body in a pre-cut tube, by a marking station for the pre-cut tube, by specific means for holding, gripping and driving in rotation, by stations for distribution and any desired emplacement of insulating cones, by an installation for heating and holding at a temperature the ends to be deformed, by a roller deformation device, by a means for extraction and discharge of the obtained container after the rotary spinning or pressing operation, by a continuous cooling device, and by means for accumulating before any desired storage, and processing or assembling, the assembly of the interconnected elements by means of transfer devices, in a continuous line.

The invention will be better understood from the following description, which relates to a preferred embodiment, given by way of non-limiting example, and explained with reference to the accompanying schematic drawings, in which:

FIG. 1 is a plan view of a device for practicing the process according to the invention;

FIG. 2 is a front elevational view, on a larger scale, of the specific holding, gripping and rotational drive means for the pre-cut tube for its rotary spinning or pressing;

FIG. 3 is an enlarged view of FIG. 2, in side elevation and cross-section, of the gripping and drive mandrel of the pre-cut tube;

FIG. 4 is a schematic front elevational view showing the preliminary heating means and means for holding at temperature, during the forming of the ends of the pre-cut tube, and FIG. 5 is a schematic perspective view explaining the operation of bilateral and simultaneous rotary spinning or pressing.

According to the invention, and as shown more particularly by way of example in FIG. 1 of the accompanying drawings, the process of producing cryogenic containers consists essentially, on a single semiautomatic line, in preparing, in a station 1, at least one monolithic body, if desired with wire mesh end rings, in surrounding said monolithic body with an insulating mat and cementing said insulating mat onto said monolithic body, then inserting and positioning the obtained subassembly, automatically, into a pre-cut tube, in a mounting and positioning assembly 2. Said tube is then marked with its technical characteristics in a marking station 3, then it is transferred into a specific means 4 for holding, gripping and driving in rotation. Then an insulating cone is if desired introduced into each end of the pre-cut tube at stations 5 for the distribution and emplacement of insulating cones, then the ends of said pre-cut tube are simultaneously heated by means of an installation 6 for heating and holding at temperature the ends to be deformed.

Then, after reaching a predetermined temperature, the ends of the pre-cut tube are deformed, by means of a roller deformation device 7, while holding a forming temperature by means of the installation 6. After producing the ends by this rotary spinning or pressing operation, the obtained container is removed and directed to a continuous cooling device 8, the container being received, at the outlet of this cooling device 8, into an accumulation means 9 before storage, processing or ultimate assembly.

According to a characteristic of the invention, the preparation of the monolithic body in the station 1 is carried out by arrangement of the monolithic body, of one or several elements, if desired with end rings of metal mesh, in a winder 10, the monolithic body being provided with its insulating mat by introduction of said mat into the winder 10, said mat being first provided, during its insertion movement, in the winder 10, with cement permitting its final securement onto the monolithic body, in said winder 10, by rotation of this latter. Thus, it is possible to produce in a particularly rapid and reliable manner, the active monolithic subassembly—possible end rings—insulating mat, the manual operations consisting simply on the one hand of placing the constituent element or elements of the monolithic body in the winder and if desired arranging end rings against templates provided for this purpose, and, on the other hand, introducing into the winder 10, after preparation of the cylindrical monolithic body, the insulating mat, which is automatically covered with an adhesive and then applied finally against the external wall of the monolithic body.

This station 1 is constituted, in addition to the winder 10, by a store 10' of monolithic bodies in the form of cylindrical elements, by a store 10" of insulating mats and by a store 10'" of metal mesh rings. Thus, an operator stationed in front of the winder 10 can serve this latter in a completely ergonomic manner, which is to say by having easy access to all the elements necessary for the preparation of the monolithic subassembly.

The assembly 2 for mounting and positioning the monolith in the pre-cut tube is preferably constituted by a store 11 of pre-cut tubes, by a means 12 for moving and inserting the monolith into the pre-cut tube and by a means 12' for holding in abutment said pre-cut tube and transferring this latter, after insertion of the monolithic body, toward the marking station 3 that is downstream, the positioning of the subassembly comprising the monolithic body in the pre-cut tube being verified by monitoring the movement of the moving and inserting means 12. Preferably, the moving and inserting means 12 for the monolithic body is constituted by a hydraulic, pneumatic or electric jack, whose movement is controlled by means of end-of-movement contacts or the like, whilst the means 12' for holding the tube in abutment consists of a simple abutment for bearing against said tube. The emplacement of the pre-cut tube in the assembly 2, in abutment against the abutment holding means 12', is carried out manually by the operator, preferably during downtime, which is to say during the preparation of the monolithic body adapted to be mounted in said tube.

In known manner, the marking station 3 of the pre-cut tube is constituted by a marking device with tools for cutting or altering the surface, of the cutter type, by laser or percussion or the like and is not described in detail.

The specific means 4 for holding, gripping and driving in rotation the pre-cut tube with the subassembly comprising the active monolithic body, shown more particularly in FIG. 2 of the accompanying drawings, consists of a stanchion 13 forming a support frame for a mandrel 14 with bilateral access, driven in rotation by a motor 15, also mounted on said frame. The mandrel 14 is preferably provided with jaws 14' for rapid gripping, controlled remotely, and need not be described in greater detail.

The specific means 4 for holding, gripping and driving in rotation the pre-cut tube is moreover completed by automatic positioning abutments 4', disposed symmetrically on opposite sides of the stanchion 13 forming the support frame for the mandrel 14 with bilateral access, and extending along the axis of said mandrel 14. These automatic positioning abutments 4' are preferably constituted by jacks, whose piston rod is provided with a plate or disc for bearing against the corresponding ends of the pre-cut tube enclosing the subassembly comprising the monolithic body, and whose movement is preliminarily regulated by means of abutments or the like. Thus, the correct positioning of the pre-cut tube with the active monolithic body, after its insertion into the mandrel 14, can be simply carried out, before gripping the jaws of this latter, by actuating simultaneously the two automatic positioning abutments 4'. Thus, the path of these abutments being first controlled, each will not displace the pre-cut tube other than within the pre-established limit, such that centering is easily effected.

The drive of the mandrel 14 by the motor 15 is preferably carried out by means of a transmission chain engaging on the one hand with a toothed disc secured to the motor shaft 15 and, on the other hand, with a toothed crown 16 secured to a surface of the mandrel 14.

FIG. 3 of the accompanying drawings shows in detail the guidance in rotation of the mandrel 14 on the frame formed by the stanchion 13 and which consists in a mounting of the assembly of said mandrel 14 in a roller bearing or ball-bearing device 17, whose internal cage 18 is movable and is provided with lateral flanges 19 for securement of the toothed drive crown 16.

The stations 5 for distribution and if desired emplacement of insulating cones, in the corresponding ends of the pre-cut tube, consist essentially in two devices for presentation of said cones in a vertical arrangement with a transfer and insertion arm 20, into said ends of the precut tube, each presentation device being provided with a gravity supply means or pressure supply means (not shown), delivering said cones individually. Such a supply means can consist either in a gravity distributor provided with individual retaining and delivery means for said cones, or be provided in the form of a spring loaded distributed moving the cones vertically against an individual holding and delivering abutment.

The heating and holding at temperature of the ends to be deformed of the pre-cut tube mounted in the mandrel 14 of the specific means 4 for holding, gripping and driving in rotation, is constituted by means of an installation 6 which comprises, on the one hand, at least two rows 21 of gas burners (FIGS. 4 and 5), each extending along a generatrix of the ends of the pre-cut tube and, on the other hand, at least one forming burner 22 adapted to precede the roller deformation device 7, so as to maintain a constant forming temperature. Preferably, the burners of the row 21 and the forming burner 22 provided at each end of the pre-cut tube, are connected to an independent distribution device 23 specific to said ends.

According to a characteristic of the invention and as shown more particularly in FIG. 5 of the accompanying drawings, the installation 6 for heating and holding at temperature the ends of the pre-cut tube can be completed by a means 24 for controlling the temperature of said ends, consisting of an infra-red cell or another temperature detector, of a type known per se. Such a control means 24 permits starting automatically the row 21 of gas burners, as soon as the desired forming temperature is reached and supervising the holding at the desired temperature by the burners 22, during forming.

The roller deformation device 7 is preferably constituted, for each end of the pre-cut tube, by two rollers 25 mounted in opposition at the height of the longitudinal axis of said tube, each with the possibility of movement along two perpendicular axes, on support tables 26. FIG. 1 of the accompanying drawings does not show, for reasons of clarity of illustration, more than a single roller 25 with its table 26. Each roller 25 is preferably mounted on a lever 27 and each support table 26 is preferably constituted by a support forming a guide for a slideway 28, movable on said guide by a jack 29 and carrying the lever 27, which is actuated pivotally with its roller 25 by means of another jack 30.

Thus, to carry out the forming of one end of the pre-cut tube, it suffices to move the corresponding rollers 25 to the vicinity of the tube forming a junction with the portion to be deformed, then to move each roller 25 in the direction of the free end of the tube by means of the jack 29 for actuating the slide 28 for supporting the lever 27 carrying each roller 25, this movement being carried out simultaneously with a pivoting movement of the lever 27, under the action of the corresponding control jack 30, tending to move the roller 25 toward the axis of the pre-cut cut tube during the longitudinal movement, so as to give to said end the desired conicity.

At the end of rotary spinning or pressing of the ends, the obtained container is dismounted from the mandrel 14 constituting the means 4, for holding, gripping and driving in rotation by means of an extraction and removal means for said container, not shown. Such an extraction means can, for example, be constituted by a mandrel or expansible chuck mounted retractably on a support and being adapted to carry out, by means of said support, a translatory movement laterally to the axis of the mandrel 14, so as to bring the catalytic container toward a transfer means with ramps or the like 31, provided if desired with a direction changer 32. Such a changer 32 is particularly adapted to provide simplification of the installation assembly by permitting having successive work stations, not in a line one behind the other, but at angular arrangements, preferably at 90°, permitting reducing the overall size.

The device 8 for continuous cooling of the catalytic containers is preferably in the form of a tunnel 33 provided, in its lower portion, with a conveyor belt 34 and, in its upper part, with heat exchangers 35, preferably with air propulsion fans. Thus, the containers passing through the cooling device 8 are subjected during all the movement through this device, to a current of fresh air which has the result of bringing the temperature of their spun turned or pressed ends to a temperature substantially equal to ambient temperature of the locality in which the installation is located, such that any risk of accidental burning of an operator, as well as any difficulty due to excess heat, is avoided.

The means 9 for accumulation of the containers before storage, processing or ultimate assembly, is connected directly to the outlet of the cooling device 8 and preferably consists in a downwardly inclined ramp from said outlet, said ramp being adapted to be provided preferably with side and rear projections permitting a relatively great storage accumulation. Thus, it is possible for an operator to carry out intermediate transfer and storage, processing or ultimate assembly and, if desired, the transfer from treatment, without it being necessary to stop the installation, the catalytic containers continuously leaving the cooling device 8 being able to accumulate for a certain time in the means 9.

Finally, the different work stations of the installation according to the invention are interconnected by means of continuous line transfer devices, which are not described in greater detail and whose construction is easily known to those skilled in the art.

According to another characteristic of the invention, the assembly of the devices concerned with the mounting of the pre-cut tubes, with the possible mounting of insulating cones in the ends of these latter, with the heating of said ends, with the deformation of these latter by spin turning or pressing, with the disassembly and transfer of the obtained containers, as well as their cooling, are preferably controlled by means of a computer control device, not shown, and by electronic transmission circuits (not shown).

FIG. 3 of the accompanying drawings shows, by way of example, a catalytic container obtained by the practice of the process according to the invention by means of the installation according to FIG. 1, this container being furthermore gripped in the mandrel 14 of the means 4, after spin turning or pressing of the ends.

As is shown in FIG. 3, this container is constituted by an active monolithic body 36 delimited at its ends by two rings 37 of metallic mesh and enclosed in an insulating mat (not shown). At each end of the monolithic body, the container is provided internally with an insulating cone 38 delimiting, with is ends, a pre-cut tube 39, containing substantially in its central portion the active monolithic body 36 and the rings 37, after spin turning or pressing said ends, of the conical insulating chambers 40.

Thanks to the invention, it is possible to provide by a continuous series of operations, in a semiautomatic material, catalytic containers, with a substantial increase in the output leading to corresponding savings in the cost of labor, whilst ensuring better quality of the obtained product. As a result, the cost of production of the catalytic containers can be substantially reduced.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. Process for the production of catalytic containers consisting essentially, on a single semiautomatic line, in preparing, in a station (1), at least one monolithic body (36), if desired with metal mesh end rings, in surrounding said monolithic body (36) with an insulating mat and cementing said insulating mat to said monolithic body (36), and then inserting and positioning the obtained subassembly, automatically, in a pre-cut tube (39), in a mounting and positioning assembly (2), in marking said tube with its technical characteristics in a marking station (3), then in transferring into a specific means (4) for holding, gripping and driving in rotation, in introducing if desired into each end of the pre-cut tube (39) an insulating cone (38) by means of stations (5) for the distribution and emplacement of insulating cones, and then simultaneously heating the ends of said pre-cut tube (39) by means of an installation (6) for heating and holding at temperature the ends to be deformed, in deforming said ends by rotary spinning or pressing, after reaching a predetermined temperature, by means of a roller deformation device (7), with holding at a forming temperature, in withdrawing and discharging the obtained container after deformation toward a continuous cooling device (8), the container being received, at the outlet of this cooling device (8), in a means (9) for accumulation before ultimate storage, processing or assembly.

2. Process according to claim 1, characterized in that the preparation of the monolithic body (36) in the station (1) is carried out by arrangement of said monolithic body (36), in one or several parts, if desired with metal mesh end rings, in a winder (10), the monolithic body (36) being provided with its insulating mat by introduction of said mat into the winder (10), said mat being first provided, during its insertion movement into the winder (10), with cement permitting its final securement on the monolithic body (36), in said winder (10), by rotation of this latter.

3. Device for producing catalytic containers, constituted essentially by a station (1) for preparation of at least one monolithic body (36), by an assembly (2) for mounting and positioning said monolithic body (36) in a pre-cut tube, by a station (3) for marking the pre-cut tube (39), by a specific means (4) for holding, gripping and driving in rotation, by stations (5) for possible distribution and emplacement of insulating cones (38), by an installation (6) for heating and holding at temperature the ends to be deformed, by a roller deformation device (7), by means for extracting and discharging the container obtained after the operation of rotary spinning or pressing, by a continuous cooling device (8), and by means (9) for accumulation before possible storage, processing or assembly, the assembly of these elements being interconnected by means of transfer devices in a continuous line.

4. Device according to claim 3, characterized in that the station (1) for preparing a monolithic body is constituted by a roller (10), by a store (10') of monolithic bodies in the form of cylindrical elements, by a store (10") of insulating mats, and by a store (10''') of metal mesh rings.

5. Device according to claim 3, characterized in that the assembly (2) for mounting and positioning the monolithic body (36) in a pre-cut tube (39) is constituted by a store (11) of pre-cut tubes, by a means (12) for moving and inserting the monolithic body (36) into the pre-cut tube (39) and by a means (12') for holding in abutment said pre-cut tube and for transferring this latter, after insertion of the monolithic body, toward the marking station (3) downstream, the positioning of the subassembly comprising the monolithic body (36) in the pre-cut tube (39) being verified by monitoring the movement of the displacement and insertion means (12).

6. Device according to claim 5, characterized in that the means (12) for movement and insertion of the monolithic body (36) is constituted by a hydraulic, pneumatic or electric jack, whose path is controlled by means of end-of-path contacts, whilst the means (12') for holding the tube in abutment consists of a simple abutment against which said tube bears.

7. Device according to claim 3, characterized in that the marking station (4) of the pre-cut tube (39) is constituted by a marking device with tools for cutting or altering the surface, of the laser cutter or percussion type.

8. Device according to claim 3, characterized in that the specific means (4) for holding, gripping and driving in rotation the pre-cut tube (39) with the subassembly comprising the active monolithic body (36), consists of a stanchion (13) forming a support frame for a mandrel (14) with access from both sides, driven in rotation by a motor (15) also mounted on said frame.

9. Device according to claim 8, characterized in that the mandrel (14) is provided with jaws (14') for rapid gripping, remotely controlled.

10. Device according to claim 8, characterized in that the specific means (4) for holding, gripping and driving in rotation the pre-cut tube (39) is moreover completed by automatic positioning abutments (4'), disposed symmetrically on opposite sides of the stanchion (13) forming the support frame for the mandrel (14) with access from both sides, and extending along the axis of said mandrel (14).

11. Device according to claim 10, characterized in that the automatic positioning abutments (4') are constituted by jacks, whose piston rod is provided with a plate or disc bearing against the corresponding ends of the pre-cut tube (39) enclosing the subassembly comprising the active monolithic body (36) and whose path is previously adjusted by means of abutments.

12. Device according to claim 3, characterized in that the stations (5) for the possible distribution and emplacement of insulating cones (38), in the corresponding ends of the pre-cut tube (39), consist essentially in two devices for presentation of said cones in a vertical posture, with an arm (20) for transferring and inserting it in said ends of the pre-cut tube (39), each presentation device being provided with supply means by gravity or by pressure, delivering said cones individually.

13. Device according to claim 12, characterized in that the supply means is either a gravity distributor provided with individual retaining and delivering means for said cones, or in the form of a spring-loaded distributor placing the cones vertically against an abutment for individual holding and delivery.

14. Device according to claim 3, characterized in that the installation (6) for heating and holding at temperature the ends to be deformed of the pre-cut tube (39) mounted in the mandrel (14) of the specific means (4) for holding, gripping and driving in rotation, comprises, on the one hand, at least two rows (21) of gas burners extending each along a generatrix of the ends of the pre-cut tube and, on the other hand, at least one forming burner (22) adapted to precede the device (7) that deforms with rollers, so as to maintain a constant forming temperature.

15. Device according to claim 14, characterized in that the row (21) of burners and the forming burner (22) associated with each end of the pre-cut tube (39), are connected to an independent distribution device (23) specific to said ends.

16. Device according to claim 14, characterized in that the installation (6) for heating and holding at temperature the ends to be deformed of the pre-cut tube (39), is completed by a means (24) for control of the temperature of said ends, consisting in an infrared cell or another temperature detector.

17. Device according to claim 3, characterized in that the roller deformation device (7) is constituted, for each end of the pre-cut tube, by two rollers (25) mounted in opposition to each other at the height of the longitudinal axis of said tube, each with the possibility of movement along two perpendicular axes, on support tables (26).

18. Device according to claim 17, characterized in that each roller (25) is mounted on a lever (27) and each support table (26) is constituted by a support forming a guide for a slide (28), moved over said guide by a jack (29) and carrying the lever (27) which is actuated to pivot with its roller (25), by means of another jack (30).

19. Device according to claim 3, characterized in that the extraction means is constituted by a mandrel or an expansible chuck mounted retractably on a support and adapted to be given by said support a translatory movement laterally to the axis of the mandrel (14), so as to bring the catalytic container toward a transfer means with ramps (31) provided if desired with a direction changer (32).

20. Device according to claim 3, characterized in that the device (8) for continuously cooling the catalytic containers is in the form of a tunnel (33) provided, in its lower portion, with a conveyor belt (37) and, in its upper portion, with heat exchangers (35).

21. Device according to claim 3, characterized in that the means (9) for accumulation of the catalytic containers before possible storage, processing or assembly, is directly connected to the output of the cooling device (8) and consists of a ramp inclined downwardly from said outlet, said ramp being provided with rear and side projections permitting a substantially great storage accumulation.

22. Device according to claim 3, characterized in that the different work stations are connected to each other by means of transfer devices in a continuous line.

23. Device according to claim 3, characterized in that all of the devices concerned with mounting the pre-cut tubes, for possible mounting of insulating cones in the ends of these latter, with heating said ends, with deforming these latter by rotary spinning or pressing, with dismounting and transfer of the obtained containers, as well as their cooling, are controlled by means of a computer control and electronic transmission circuits.

24. Device for producing catalytic containers, consisting essentially of a single semiautomatic line, comprising a station (1) for preparing at least one monolithic body (36), if desired with metal mesh end rings, means for surrounding said monolithic body (36) with an insulating mat and for cementing said insulating mat to said monolithic body (36), means for then inserting and positioning the obtained subassembly, automatically, in a pre-cut tube (39) in a mounting and positioning assembly (2), a marking station (3) for marking said tube with its technical characteristics, means for transferring the tube into a specific means (4) for holding, gripping and driving in rotation, means for introducing if desired into each end of the pre-cut tube (39) an insulating cone (38) by means of stations (5) for the distribution and emplacement of insulating cones, an installation (6) for simultaneously heating the ends of said pre-cut tube (39) by heating and holding at temperature the ends to be deformed, a roller deformation device (7) for deforming said ends by rotary spinning or pressing after reaching a predetermined temperature and for holding at a forming temperature, means for withdrawing and discharging the obtained container after deformation toward a continuous cooling device (8), the container being received at the outlet of this cooling device (8) in a means (9) for accumulation before ultimate storage, processing or assembly.

* * * * *